US008938739B2

(12) United States Patent
Kandhalu Raghu et al.

(10) Patent No.: US 8,938,739 B2
(45) Date of Patent: Jan. 20, 2015

(54) RESOURCE SHARING AWARE TASK PARTITIONING FOR MULTIPROCESSORS

(75) Inventors: Arvind Kandhalu Raghu, Pittsburgh, PA (US); Sejoong Lee, Allen, TX (US); Soon-Hyeok Choi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 291 days.

(21) Appl. No.: 13/487,185

(22) Filed: Jun. 2, 2012

(65) Prior Publication Data
US 2013/0326523 A1 Dec. 5, 2013

(51) Int. Cl.
*G06F 9/46* (2006.01)
*G06F 9/48* (2006.01)

(52) U.S. Cl.
CPC ............... *G06F 9/4881* (2013.01); *G06F 9/46* (2013.01)
USPC .......................... 718/102; 718/100; 718/105

(58) Field of Classification Search
CPC ............................ G06F 9/4881; G06F 9/4887
USPC .......................................... 718/102, 103, 105
See application file for complete search history.

(56) References Cited

U.S. PATENT DOCUMENTS

| 6,567,840 B1 * | 5/2003 | Binns et al. | 718/103 |
| 8,615,763 B2 * | 12/2013 | Raghu et al. | 718/100 |
| 2005/0229177 A1 * | 10/2005 | Torii et al. | 718/100 |
| 2008/0028415 A1 * | 1/2008 | Binns et al. | 718/107 |
| 2010/0242040 A1 * | 9/2010 | Koo et al. | 718/102 |
| 2013/0139176 A1 * | 5/2013 | Kang | 718/105 |
| 2014/0040904 A1 * | 2/2014 | Giusto et al. | 718/103 |

OTHER PUBLICATIONS

Nemati et al. "Partitioning Real-Time Systems on Multiprocessors with Shared Resources". Springer-Verlag Berlin Heidelberg, 2010, pp. 253-269.*
Lakshmanan et al. "Coordinated Task Scheduling, Allocation and Synchronization on Multiprocessors", Proceedings of 30th IEEE Real-Time Systems Symposium, 2009, pp. 469-478.*
Memati et al. "Blocking-Aware Partitioning for Multiprocessors", Technical Report, Malardalen Real-Time Research Centre (MRTC), Malardalen University (Mar. 2010), pp. 1-10 Link "http://www.mrtc.mdh.se/publications/2137.pdf".*

* cited by examiner

*Primary Examiner* — Emerson Puente
*Assistant Examiner* — Willy W Huaracha
(74) *Attorney, Agent, or Firm* — Robert D. Marshall, Jr.; Frederick J. Telecky, Jr.

(57) ABSTRACT

A multi processor task allocation method is described that considers task dependencies while performing task allocation in order to avoid blocking of a task's execution while waiting for the resolution of the dependency. While allocating the tasks to the processors the potential blocking time is considered, and the best allocation that will have the least amount of blocking time is found.

4 Claims, No Drawings

RESOURCE SHARING AWARE TASK PARTITIONING FOR MULTIPROCESSORS

BACKGROUND OF THE INVENTION

This invention considers the task allocation problem in a multi-processor system. Given a set of software tasks to be run in a multi-processor system, the software tasks are normally distributed to the individual processors. The tasks allocation is usually done statically, and tasks do not migrate across the processors.

The task allocation algorithms attempt to maximize aggregate performance of task executions of the multiple processors while performing task allocation. Traditional algorithms for task allocation have dealt mostly with independent tasks with no interactions. However, in real life scenarios, tasks are dependent on each other and such dependencies slow down the progress of task execution especially if the tasks reside in different processors. As a result, the aggregate performance of M processors does not converge to M times the performance of a single processor, which is well known limitation of multi-processor systems.

The task allocation method described in this invention considers task dependencies while performing task allocation. The task dependency can cause blocking of a task execution while waiting for the resolution of the dependency. While allocating the tasks to the processors, the potential blocking time is considered, and finding the best allocation that will have least blocking time is attempted to achieve maximum system performance.

SUMMARY OF THE INVENTION

If two tasks sharing the same resource are allocated to different processors, blocking of a task execution can occur if the two tasks try to access the shared resource at the same time. On the other hand, if the tasks are allocated to the same processor, only one of those two tasks is executed at a time—because they are in a single processor, and the access to the shared resource access is naturally arbitrated.

A novel task allocation method is shown that analyzes the worst-case blocking time of tasks considering the dependencies and minimizes it by assigning tasks depending on each other to the same processor. In addition, we also try to balance the utilization of the processors, which is the goal of conventional load-balancing based task allocation algorithms.

The invention consists of two parts: A method of analyzing the blocking time of each task, and a method of task allocation based on the analyzed blocking time.

DETAILED DESCRIPTION OF PREFERRED EMBODIMENTS

A uniform multi-processor architecture is assumed, where all processors have equal processing capabilities, and that task allocation is done statically at once and tasks do not migrate across the processors.

The processors are assumed to use Multi-processor Priority Ceiling Protocol (MPCP) in order to provide resource sharing across tasks. The goal of this protocol is to prevent the formation of deadlocks and of chained blocking. The underlying idea of this protocol is to ensure that when a job J preempts the critical section of another job and executes its own critical section z, the priority at which this new critical section z will execute is guaranteed to be higher than the inherited priorities of all the preempted critical sections. If this condition cannot be satisfied, job J is denied entry into the critical section z and suspended, and the job that blocks J inherits J's priority. This idea is accomplished by first assigning a priority ceiling to each semaphore, which is equal to the highest priority task that may use this semaphore. We then allow a job J to start a new critical section only if J's priority is higher than all priority ceilings of all the semaphores locked by jobs other than J.

Unless we assume the use of MPCP, the system can be placed in deadlock situation if multiple tasks try to access the same shared resource. In consequence, we cannot bound the blocking time, in other words, the worst-case blocking time is infinite.

Two different types of execution control policies are considered: MPCP-suspend and MPCP-spinning. In MPCP-suspend, a task will be suspended if the task fails to gain the shared resource. With this policy, another task can be executed while the task that has failed to access the shared resource is suspended. In MPCP-spinning, a task will be polling the shared resource until it succeeds in gaining access of the shared resource. With this policy, the processor is held by the task so only a higher priority task can preempt the task. The blocking time for those two different policies are analyzed.

We consider periodic real-time tasks $\tau = \{\tau_1, \ldots, \tau_n\}$. Each task $\tau_i = (C_i, T_i, D_i)$ is characterized by three parameters: the worst-case execution time (WCET) $C_i$, period $T_i$, and deadline $D_i$. The following is assumed:

The C, T, and D parameters are known a priori.

The scheduler uses fixed-priority scheduling with tasks having conventional deadline monotonic scheduling priorities.

While a task is being executed, it may access a global shared resource. We call such section of a task a critical section. The rest of the typical execution part is called normal section. A critical section of a task is the part which can generate contention due to shared resource access. We will assume that a task may have multiple critical sections, and we assume that the critical sections are not nested. Based on these assumptions, we can model the execution time of a task, C, as an alternating sequence of normal execution sections and critical sections as shown below.

$$\tau_i : ((C_{i,1}, C'_{i,1}, C_{i,2}, C'_{i,2}, \ldots, C'_{i,s(i)-1}, C_{i,s(i)}), T_i)$$

where, s(i): number of normal execution segments of $\tau_i$.
s(i)−1: is the number of critical section execution segments of $\tau_i$.
$C_{i,j}$: WCET of the jth normal execution of $\tau_i$.
$C'_{i,k}$: WCET of the kth critical section of $\tau_i$.
$T_i$ denotes the period of $\tau_i$ (with implicit deadline).
$\tau_{i,j}$ denotes the j-th normal execution segment of task $\tau_i$.
$\tau'_{i,j}$ denotes the j-th critical section of task $\tau_i$.
We assume that the tasks are ordered in increasing order of priorities i.e. i<j implies that $\tau_j$ has higher priority than $\tau_i$.
The following symbols are used as defined below.
$P_i$=i-th processor
$P(\tau_i)$=The processor index assigned to $\tau_i$
$R(\tau_{i,j})$=The resource accessed in a critical section $\tau_{i,j}$
$C_i$=Sum of all the normal and critical sections of $\tau_i$, $$C_i = \sum_{j=1}^{s(i)} C_{i,j} + \sum_{k=1}^{s(i)-1} C'_{i,k}$$

$B^r$ = Remote blocking time

First the MPCP Suspend mode is analyzed. Blocking time is an additional delay while executing a critical section of a task. We will think of an execution time of the k-th critical section of $\tau_i$, or $\tau_{i,j}$. At the time of starting execution of $\tau'_{i,k}$, it will either be started right away or need to wait for some time, depending on whether the global resource the critical section tries to use is locked by another task or not. If the global resource is free to use, the $\tau'_{i,k}$ will start right away. And MPCP guarantees that the task continues execution without interference until the end of the current critical section.

On the other hand, if the global resource is already locked by another task in another processor, $\tau_i$ has to be suspended or blocked until the global resource is released. The blocking can happen either by a lower priority task or by higher priority tasks.

First, let us consider the blocking by lower priority tasks. In the case of blocking by a lower priority task, the blocking occurs at most one time per each critical section execution and no nested blocking is possible because MPCP prevents any priority inversion. In more detail, the only blocking scenario that can be caused by a lower priority task, say $\tau'_{l,u}$, is the very initial start time of the $\tau'_{i,k}$, where $\tau_l$ has already occupied the shared resource, so the $\tau_i$ has to wait $\tau_l$, which is called a priority inversion scenario. No other lower priority task can win the resource because the scheduler will give the priority to $\tau_i$ which is a higher priority task.

Therefore, the worst case blocking time by lower priority tasks is the maximum critical section response time of all the lower priority tasks. We call the worst case response time of $\tau'_{i,k}$ as $W'_{i,k}$. Then, the worst-case blocking time of $\tau'_{i,k}$ caused by lower priority tasks, or $B_{i,k}^{r\_low}$ is represented by the Equation (1).

$$B_{i,k}^{r\_low} = \max_{l \leq i \,\&\, (\tau'_{l,u}) \in R(\tau'_{i,k})} (W'_{l,u}) \quad (1)$$

Note that the response time of a critical section, or $W'_{l,u}$ in (1) should include both of actual execution time of $\tau'_{l,u}$ and all possible preemption time caused by higher priority task. Because the task $\tau_l$ is executing a critical section, the preemption is possible only by same processor tasks in critical mode: a task in a processor cannot preempt a task in another processor, therefore only the same processor tasks can cause preemption. And a task in a critical mode has always higher priority than any other tasks in normal mode by MPCP algorithm. Therefore the preemption is caused by tasks having higher global ceiling priority. In summary, the worst-case response time of $\tau'_{i,k}$, which we call $W'_{i,k}$, is represented by Equation (2).

$W'_{i,k}$ = Pure execution time of the critical section + (2)

all possible preemptions by higher global ceiling priority tasks in the same processor =

$$C'_{i,k} + \sum_{\tau_u \in P(\tau_i)} \max_{1 \leq v \leq s(u) \,\&\, gc(u,v) > gc(i,k)} C'_{v,m}$$

Using Equations (1) and (2), we can calculate the blocking time that can be caused by lower priority tasks.

Next we consider the blocking time that can be caused by higher priority tasks, or $B_{i,k}^{r\_high}$. The key difference from the blocking time by lower priority is that potentially all of the high priority task can cause blocking if all of the high priority tasks compete to gain the same global resource. Therefore, $B_{i,k}^{r\_high}$ is the summation of the possible blockings by all the higher priority tasks as shown Equation (3).

$$B_{i,k}^{r\_high} = \sum_{h > i \,\&\, (\tau'_{h,v}) \in R(\tau'_{i,k})} (W_{h,v})$$

The Equation (3) does not consider a situation where the blocking time is so long that a high priority task may appear multiple times within the blocking time. In other words, if the period of a higher priority task, $T_h$, is longer than the blocking time, the higher priority task can block the $\tau_i$ multiple times. Considering this effect, we obtain the Equation (4).

$$B_{i,k}^{r\_high} = \sum_{h > i \,\&\, (\tau'_{h,v}) \in R(\tau'_{i,k})} \left(\left\lceil \frac{B_{i,k}^r}{T_h} \right\rceil + 1\right)(W_{h,v}), \quad (4)$$

where $B^r = B^{r\_high} + B^{r\_low}$.

Combining (1) and (4), we obtain the following equation (5).

$$B_{i,k}^r = \max_{l < i \,\&\, (\tau'_{l,u}) \in R(\tau'_{i,k})} (W_{l,u}) + \sum_{h > i \,\&\, (\tau'_{h,v}) \in R(\tau'_{i,k})} \left(\left\lceil \frac{B_{i,k}^r}{T_h} \right\rceil + 1\right)(W_{h,v})$$

Equation (5) is a recursive equation where $B^r$ term is defined by $B^r$. To solve this equation, we convert Equation (5) into a convergence equation (6) as shown below.

$$B_{i,k}^{r,n+1} = \max_{l < i \,\&\, (\tau'_{l,u}) \in R(\tau'_{i,k})} (W_{l,u}) + \sum_{h > i \,\&\, (\tau'_{h,v}) \in R(\tau'_{i,k})} \left(\left\lceil \frac{B_{i,k}^{r,n}}{T_h} \right\rceil + 1\right)(W_{h,v})$$

where $$B_{i,k}^{r,0} = \max_{l < i \,\&\, (\tau'_{l,u}) \in R(\tau'_{i,k})} (W_{l,u})$$

While computing $B^{r,n+1}$ using $B^{r,n}$, we stop the iteration when $B^{r,n+1} = B^{r,n}$. $B^{r,n}$ is the solution of equation (5).

With MPCP spinning the tasks spin while waiting for the shared resource to be released. This avoids further interference from shared resource requests from lower-priority tasks, which may otherwise be issued during task suspension. As a result, the number of priority inversions per task is restricted to one per lower priority task. Under MPCP-spin, the worst-case computation time of task $\tau_i$ is bounded by the convergence of $W_i$ of:

$$W_i^{n+1} = C_i^* + \sum_{h < i \,\&\, \tau_h \in P(\tau_i)} \left\lceil \frac{W_i^n}{T_h} \right\rceil C_h^* + \sum_{l > i \,\&\, \tau_l \in P(\tau_i)} \max_{1 \leq k < s(l)} C'_{l,k} \quad (7)$$

As can be seen, spinning reduced the preemptions from global critical sections of lower priority tasks. However, spinning results in additional preemption from higher priority tasks as captured by using the $C^*_h$.

As mentioned earlier global critical sections result in huge penalties on multiprocessor performance. One way to reduce this is to pack synchronizing task together as suggested in the Resource Sharing Aware (RSA) algorithm that bundles tasks sharing resources together to form composite tasks. Then a worst-fit heuristic is applied on the composite as well as the independent tasks. If the composite task does not "fit" into a processor then the tasks are broken apart depending upon the cost of breakage which is the blocking time as given in equation (1).

The RSA algorithm may be described as follows:

Inputs:

$((C_{i,1}, C'_{i,1}, C_{i,2}, C'_{i,2}, \ldots, C_{i,s(i)-1}, C'_{i,s(i)}) T_i)$ of each task $\tau_i$, i=1 to n where n is total number of tasks, s(i) is the total number of normal execution segments of $\tau_i$, s(i)−1 is the total number of critical section execution segments.

Maximum number of processors 'm'.

Outputs:

Task allocation $TA_j$ for each of the processors: $\{M_1, M_2, \ldots, M_m\}$

Algorithm:

For each task $\tau_i$

Calculate utilization $u_i = C_i/T_i$

End for

Combine tasks sharing resources to form composite tasks and calculate the composite task utilization.

Arrange the composite and independent tasks in non-increasing order of their utilization in array 'A'.

Apply worst-fit-decreasing (WFD) heuristic on the tasks in 'A'.

Use Response time test for schedulability test.

If schedulability test does not pass for a composite task

Determine various "breaking costs" of the composite task.

Use equation 1 to determine remote blocking term $B^r$.

Higher the $B^r$, higher the breaking cost.

Break the composite task with lowest $B^r$.

What is claimed is:

1. A method of multiprocessor task partitioning comprising the steps of:
    calculating processor utilization for each task;
    combining tasks sharing a common resource to form composite tasks;
    calculating processor utilization for each composite task;
    arranging not combined tasks and the composite tasks in a non increasing order of their processor utilization in an array;
    applying a worst fit decreasing heuristic on the tasks in said array;
    using a response time test for the schedulability on each composite task;
    if the schedulability test does not pass for a composite task:
    determining the various breaking cost for the composite task by calculating the remote blocking term $B^r$ determined by using the following equation:

$$B_{i,k}^{r\_low} = \max_{1 < i \& (\tau'_{l,u}) \in R(\tau'_{i,k})} (W'_{l,u}).$$

and
    breaking the composite task with the lowest $B^r$.

2. A method of multiprocessor task partitioning comprising the steps of:
    calculating processor utilization for each task;
    combining tasks sharing a common resource to form composite tasks;
    calculating processor utilization for each composite task;
    arranging not combined tasks and the composite tasks in a non increasing order of their processor utilization in an array;
    applying a worst fit decreasing heuristic on the tasks in said array;
    using a response time test for the schedulability on each composite task;
    if the schedulability test does not pass for a composite task:
    determining the various breaking cost for the composite task by calculating the remote blocking term $B^r$ is determined by using the following equation:

$$B_{i,k}^{r\_high} = \sum_{h>i \& (\tau'_{h,v}) \in R(\tau'_{i,k})} (W'_{h,v}).$$

breaking the composite task with the lowest $B^r$.

3. A method of multiprocessor task partitioning comprising the steps of:
    calculating processor utilization for each task;
    combining tasks sharing a common resource to form composite tasks;
    calculating processor utilization for each composite task;
    arranging not combined tasks and the composite tasks in a non increasing order of their processor utilization in an array;
    applying a worst fit decreasing heuristic on the tasks in said array;
    using a response time test for the schedulability on each composite task;
    if the schedulability test does not pass for a composite task:
    determining the various breaking cost for the composite task by calculating the remote blocking term $B^r$ is determined by using the following equation:

$$B_{i,k}^r = \max_{1 < i \& (\tau'_{l,u}) \in R(\tau'_{i,k})} (W_{l,u}) + \sum_{h>i \& (\tau'_{h,v}) \in R(\tau'_{i,k})} \left( \left\lceil \frac{B_{i,k}^{r,n}}{T_h} \right\rceil + 1 \right)(W_{h,v}).$$

4. The method of claim 3 wherein:
    the recursive equation is converted into a convergence equation:

$$B_{i,k}^{r,n+1} = \max_{1 < i \& (\tau'_{l,u}) \in R(\tau'_{i,k})} (W_{l,u}) + \sum_{h>i \& (\tau'_{h,v}) \in R(\tau'_{i,k})} \left( \left\lceil \frac{B_{i,k}^{r,n}}{T_h} \right\rceil + 1 \right)(W_{h,v})$$

where $$B_{i,k}^{r,0} = \max_{1 < i \& (\tau'_{l,u}) \in R(\tau'_{i,k})} (W_{l,u})$$

and where the iteration is terminated when $B^{r,n+1} = B^{r,n}$, where $B^{r,n}$ is the blocking term for processor n.

* * * * *